(12) United States Patent
Ball et al.

(10) Patent No.: US 8,656,806 B2
(45) Date of Patent: Feb. 25, 2014

(54) CAM SYSTEM HAVING COMPLIANT FOLLOWER

(75) Inventors: Donald Ball, Melbourne, FL (US); Christopher Corey, Palm Bay, FL (US); Patrick Waters, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 363 days.

(21) Appl. No.: 13/081,867

(22) Filed: Apr. 7, 2011

(65) Prior Publication Data

US 2012/0255510 A1 Oct. 11, 2012

(51) Int. Cl.
*F16H 53/06* (2006.01)

(52) U.S. Cl.
USPC .......................................................... 74/569

(58) Field of Classification Search
USPC ............ 74/567, 569, 570.1, 10.29, 10.6, 834; 269/229, 231
IPC ........................................................ F16B 2/18
See application file for complete search history.

(56) References Cited

U.S. PATENT DOCUMENTS

| | | | |
|---|---|---|---|
| 2,829,541 A | 4/1958 | Korte | |
| 3,433,091 A | 3/1969 | Jullien-Davin | |
| 3,885,470 A | 5/1975 | Costa et al. | |
| 3,987,688 A | 10/1976 | Tarbet | |
| 4,148,601 A | 4/1979 | Kulabukhov et al. | |
| 4,317,433 A | 3/1982 | Fuhrmann | |
| 5,076,782 A | 12/1991 | Campbell et al. | |
| 7,455,302 B2 | 11/2008 | Young et al. | |
| 8,511,203 B2* | 8/2013 | Ball et al. | 74/567 |
| 2002/0194726 A1* | 12/2002 | Chang | 29/751 |
| 2010/0041523 A1* | 2/2010 | Bingham et al. | 482/65 |
| 2012/0255392 A1* | 10/2012 | Ball et al. | 74/569 |

FOREIGN PATENT DOCUMENTS

| | | |
|---|---|---|
| DE | 931141 | 8/1955 |
| EP | 2168452 | 3/2010 |

* cited by examiner

*Primary Examiner* — Marcus Charles
*Assistant Examiner* — Adam D Rogers
(74) *Attorney, Agent, or Firm* — Harness, Dickey & Pierce, PLC

(57) ABSTRACT

A compliant follower cam system includes a cam rotatable about a cam rotational axis continuously aligned with a cam displacement axis. The cam has a body center spaced from the rotational axis. A compliant follower has an elastically deformable first contact wall positioned proximate to a cavity. The first contact wall is directly contacted by the cam body outer surface. A compliant follower non-deflected condition occurs when a first contact wall outer surface directly contacts the cam body outer surface prior to deflection of the first contact wall, with the cam body center out of alignment with the displacement axis. Rotating the cam moves the body center toward the compliant follower into alignment with the displacement axis. The cam thereby deflects the first contact wall into the cavity defining a compliant follower deflected condition and creates a biasing force releasably frictionally engaging the first contact wall and cam.

10 Claims, 5 Drawing Sheets

CAM SYSTEM HAVING COMPLIANT FOLLOWER

FIELD

The present disclosure relates to cam and follower systems used to create an over-center locking position for component retention.

BACKGROUND

Cam and follower designs are known wherein the cam is an incompressible member which when rotated brings one or more lobes of the cam into contact with the follower to displace and/or retain the position of a member. Cams can be used to create top-dead center, bottom-dead-center and over-center contact positions and to create locking positions of components and/or fastening designs. Disadvantages of known cam and follower systems result from the use of a solid cam and cam lobes that commonly require a deflection system, for example in the form of biasing springs or biasing devices separate from the cam and follower that are required to allow cam lobe displacement to occur in reaching a cam locked position. Deflection systems increase system complexity. The disadvantages are further manifested in multiple part system increased cost, and alignment/tolerance issues that must be accommodated. Cam, follower and component wear also result from the frictional contact of the cam which requires subsequent adjustment of the cam and/or follower positioning.

SUMMARY

According to several embodiments, a compliant follower cam system includes a substantially incompressible cam having a cam body outer surface. A compliant follower has an elastically deformable first contact wall in direct contact with at least a portion of the cam body outer surface. The first contact wall is deflected to a deflected condition by rotation of the cam.

According to other embodiments, a compliant follower cam system includes a cam rotatable with respect to a cam rotational axis, the cam rotational axis continuously aligned with a cam displacement axis. The cam has a cam body center spaced from the cam rotational axis. A compliant follower has a first contact wall of an elastically compressible material positioned proximate to a cavity. The first contact wall is aligned to be directly contacted by the cam body outer surface. A non-deflected condition of the compliant follower is defined when an outer surface of the first contact wall is in direct contact with the cam body outer surface prior to deflection of the elastically deformable material, with the cam body center out of alignment with the cam displacement axis. The cam when thereafter rotated with respect to the cam rotational axis moves the cam body center toward the compliant follower and into alignment with the cam displacement axis. The cam thereby deflects the first contact wall into the cavity and defines a deflected condition of the compliant follower and creates a biasing force releasably frictionally engaging the first contact wall with the cam.

According to further embodiments, a compliant follower cam system includes a cam rotatable with respect to a cam rotational axis. The cam rotational axis is continuously aligned with a cam displacement axis. The cam has a cam body center spaced from the cam rotational axis. A compliant follower has a first contact wall of an elastically deformable material positioned proximate to a cavity, the first contact wall aligned to be directly contacted by the cam body outer surface. A second contact wall of the compliant follower is aligned to directly contact a workpiece. A non-deflected condition of the compliant follower is defined when an outer surface of the first contact wall is in direct contact with the cam body outer surface prior to deflection of the elastically deformable material, with the cam body center out of alignment with the cam displacement axis. The cam when thereafter rotated with respect to the cam rotational axis acts to move the cam body center toward the compliant follower and into alignment with the cam displacement axis. The cam thereby deflects the first contact wall into the cavity defining a deflected condition of the compliant follower, and creates a biasing force releasably frictionally engaging the first contact wall with the cam.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
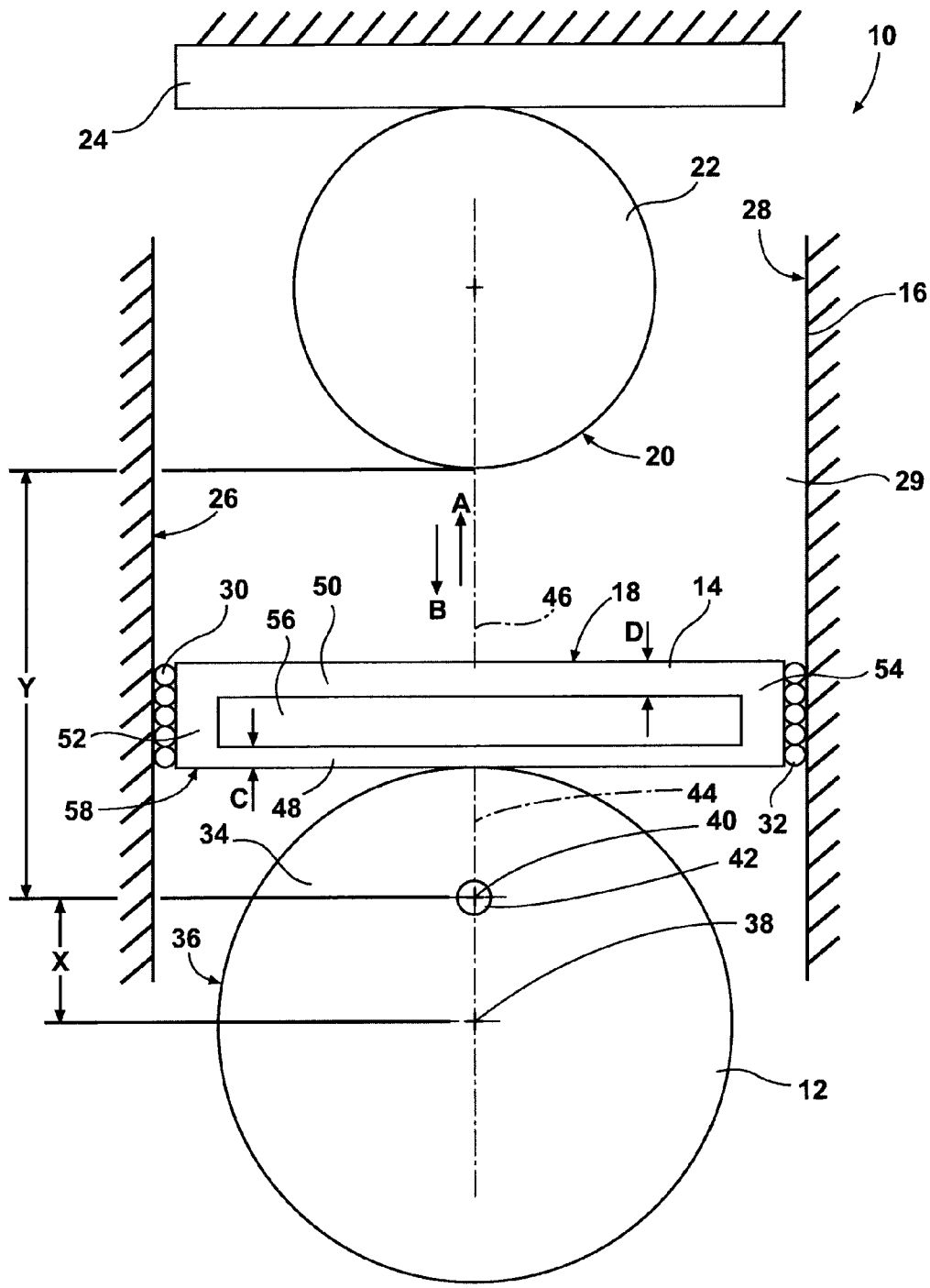
FIG. 1 is a front elevational view of a cam and compliant follower system in a bottom-dead-center position prior to deflection of the compliant follower according to the present disclosure.

Referring to FIG. 1, a cam system 10 includes a substantially incompressible cam 12 which is positioned in contact with a sliding compliant follower 14. Compliant follower 14 slides within a guide member 16 until a first contact surface 18 of compliant follower 14 contacts an outer surface 20 of a work-piece 22. Compliant cam 12 rotates to slidably displace follower 14 in a first direction "A" until contact is made between follower 14 and work-piece 22. Work-piece 22 is held or fixed in position by or at a fixed member 24.

Guide member 16 can include opposite first and second guide walls 26, 28, which between them define a guide member bore 29 within which at least a portion of cam 12 can be positioned and within which compliant follower 14 is slidably displaced. To promote a controlled sliding motion of compliant follower 14, first and second bearing members 30, 32 are oppositely positioned about compliant follower 14, having first bearing member 30 in sliding contact with first guide wall 26 and second bearing member 32 in sliding contact with second guide wall 28.

Cam 12 includes a cam body 34 which, according to several embodiments, is one-piece, homogeneous and substantially solid, and can be made from a polymeric or a metal material. According to other embodiments, cam body 34 can be created from a composite of materials. The term "homogeneous" as used herein refers to a component such as cam 12 wherein a material of the component is the same throughout its volume, and any connections between portions of the component are provided during the manufacturing process such that mechanical, welded, bonded, or similar connection methods for the portions are not used. According to several embodiments, cam body 34 defines a geometric shape, e.g., a circular shape as shown, or an oval, obround, or other geometric shape having a cam body outer surface 36 defining an outer perimeter of cam body 34.

In a first or bottom-dead-center position of cam 12 shown, a cam body center 38 defining a geometric center of cam 12 is axially aligned with a cam rotational axis 40. A cam mount aperture 42 is co-axially aligned with cam rotational axis 40 and both are spatially separated from cam body center 38 by a fixed center-to-axis spacing "X". The cam rotational axis 40 is fixedly spaced from the closest point of contact with outer surface 20 of work-piece 22 by an axis-to-surface spacing "Y". Cam mount aperture 42 is provided to rotatably connect cam 12 to a rotating component (not shown) such as a shaft of a motor using a rotational fastener (not shown). In the first or bottom-dead-center position of cam 12 both cam body center 38 and cam rotational axis 40 are axially aligned on a cam displacement axis 44, with cam rotational axis 40 positioned between cam body center 38 and compliant follower 14 as viewed in FIG. 1. Cam displacement axis 44 in the bottom-dead-center position of cam 12 according to several embodiments is centrally aligned between first and second guide walls 26, 28, although central alignment is not required.

According to additional embodiments, in the bottom-dead-center position of cam 12 cam displacement axis 44 is coaxially aligned with a bore axial centerline 46 of guide member bore 29 such that opposed portions of cam body outer surface 36 are substantially equally spaced with respect to each of first and second guide walls 26, 28. Compliant follower 14 is displaced in the first direction "A" by rotation of cam 12 and, conversely, can also return in an opposite second direction "B" by an opposite rotation of cam 12 to provide either direct contact between first contact surface 18 and outer surface 20 of work-piece 22, or to provide a clearance space or distance between first contact surface 18 and outer surface 20.

According to several embodiments, compliant follower 14 is entirely made of an elastically deformable material and includes opposed first and second contact walls 48, 50 and opposed first and second follower side walls 52, 54. A follower void space or cavity 56 is created and bounded between first and second contact walls 48, 50 and first and second follower side walls 52, 54. The cam body outer surface 36 of cam 12 contacts the first contact wall 48 and when cam 12 is rotated, the cam body outer surface 36 slides against a follower second contact surface 58 facing outwardly of first contact wall 48. To induce inward deflection of first contact wall 48 and minimize or prevent inward deflection of second contact wall 50, first contact wall 48 has a first contact wall thickness "C" which is less than a second contact wall thickness "D" of second contact wall 50. According to additional embodiments, only the first contact wall 48 of compliant follower 14 is made of an elastically deformable material. The deflection of first contact wall 48 is better described in reference to FIG. 3.

A depth or thickness and a geometry in cross section of cams 12 and compliant followers 14 of the present disclosure can vary. Although cams 12 and compliant followers 14 having opposed, substantially planar faces and cam body outer surface 36 and first and second contact surfaces 18, 58 which are substantially perpendicular to the faces can be used, additional geometries can also be used. These include but are not limited to at least one of the faces being curved, non-symmetrical, faceted, or the like. Portions of the cam body outer surface 36 and either or both of first and second contact surfaces 18, 58 can also be angular, irregular or locally raised.

Referring to FIG. 2 and again to FIG. 1, the mechanical advantage of cam 12 is used by converting a rotational motion of cam 12 into a longitudinal displacement of compliant follower 14. Initially and as previously described, direct contact is made between cam body outer surface 36 and second contact surface 58 of compliant follower 14. Cam rotational axis 40 is retained at the axis-to-surface spacing "Y", therefore as cam 12 is subsequently rotated in a counter-clockwise cam direction of rotation "E" by rotation through cam rotational axis 40, a difference in a center-to-axis spacing "Z" is created between cam rotational axis 40 and cam body center 38 which is less than the center-to-axis spacing "X". Center-to-axis spacing "Z" can be calculated as the cosine of an angle α, given a fixed dimension for center-to-axis spacing "X". As cam body center 38 rotates with respect to cam rotational axis 40, a component of cam axial displacement is created parallel to first direction "A", thereby displacing compliant follower 14 in the first direction "A".

Cam 12 is rotated in the cam direction of rotation "E" until cam body center 38 is positioned to the right of cam displacement axis 44 and bore axial centerline 46, and above cam rotational axis 40 as shown. In this position, cam body center 38 is located closer to second contact surface 58 of compliant follower 14 than cam rotational axis 40. This rotated position of cam 12 creates direct contact between outer surface 20 of work-piece 22 and first contact surface 18 of compliant follower 14. When initial contact is made between first contact surface 18 of compliant follower 14 and outer surface 20 of work-piece 22, cam rotational axis 40 is positioned at a first spacing dimension "F" with respect to second contact surface 58. At this time, a minimal force is applied, therefore first contact wall 48 is in an initial, substantially non-deflected condition and cam body outer surface 36 makes substantially point contact at a contact location 60 with first contact wall 48. Subsequent application of force causes deflection of first contact wall 48, therefore, because cam 12, work-piece 22 and fixed member 24 are substantially incompressible, any subsequent rotation of cam 12 about cam rotational axis 40 in the cam direction of rotation "E" will result in a deflection of first contact wall 48 of compliant follower 14.

Figure 2:
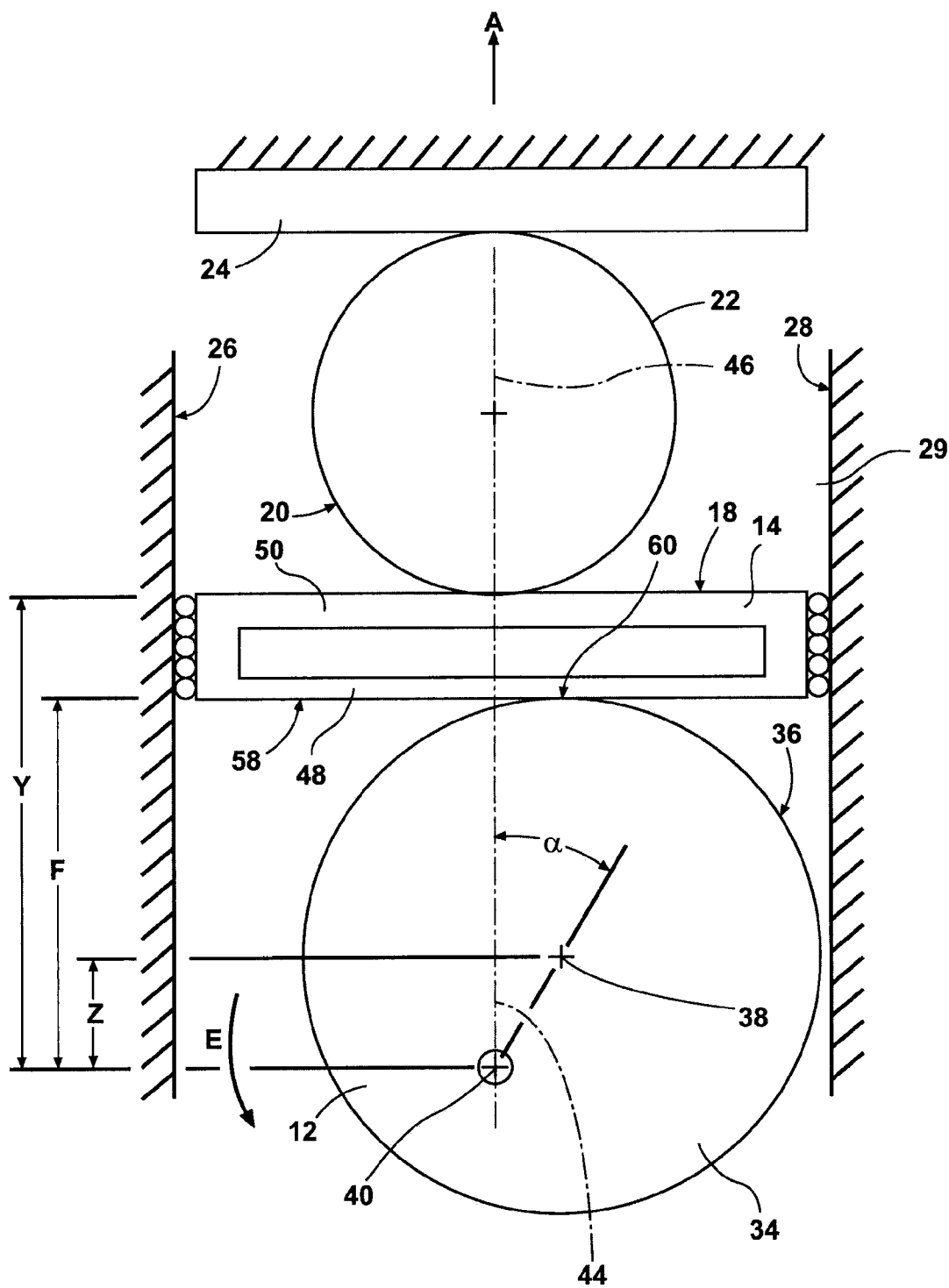
FIG. 2 is a front elevational view similar to FIG. 1 further showing a direct contact position of the compliant follower with a workpiece prior to deflection of the compliant follower.

Referring to FIG. 3 and again to FIGS. 1 and 2, cam 12 is shown following additional rotation about cam direction of rotation "E" until cam rotational axis 40 and cam body center 38 are once again both axially aligned with cam displacement axis 44 and bore axial centerline 46, defining a top-dead-center position of cam 12. The top-dead-center position of cam 12 is rotated substantially 180 degrees with respect to the position of cam 12 in the bottom-dead-center position shown in FIG. 1. Because cam rotational axis 40 is maintained at the axis-to-surface spacing "Y", and first spacing dimension "F", shown and described in reference to FIG. 2 is maintained, a deflection of a first contact wall portion 48a of first contact wall 48 in the first direction "A" will occur. The deflection of first contact wall 48 results in first contact wall portion 48a displacing at least partially into cavity 56. A maximum extension dimension "G" of cam 12 in the first direction "A" coincides with a maximum deflected condition of first contact wall portion 48a. The elastically displaced material of first contact wall portion 48a can follow the geometry of cam body outer surface 36, and therefore in the embodiment shown defines a substantially circular geometry. This deflection of first contact wall portion 48a occurs elastically, thereby creating a biasing force acting from first contact wall portion 48a through compliant follower 14 to work-piece 22, having a component of the biasing force "W" acting parallel to first direction "A".

As previously noted, the bottom-dead center-position is established when cam rotational axis 40 is positioned between compliant follower 14 and cam body center 38, with both cam rotational axis 40 and cam body center 38 axially aligned with cam displacement axis 44 and bore axial centerline 46. Conversely, the top-dead-center position is established when cam body center 38 is positioned between cam rotational axis 40 and compliant follower 14, again having both cam rotational axis 40 and cam body center 38 axially aligned with cam displacement axis 44 and bore axial centerline 46.

The top-dead-center position defines a deflected condition of first contact wall 48 of compliant follower 14. According to several embodiments, the top-dead-center position of cam 12 also provides substantially equal spacing between opposed portions of cam body outer surface 36 and each of the first and second guide walls 26, 28, however equal spacing is not required. The component of the biasing force created by elastically deflecting first contact wall 48 acting in the first direction "A" in the top-dead-center position of cam 12 is directed through the center of work-piece 22 and thereby maximizes a holding force retaining compliant follower 14 in direct contact with work-piece 22. In a maximum deflected condition first contact wall 48 contacts second contact wall 50. From the top-dead-center position of cam 12, cam 12 can be returned to the bottom-dead-center position by continued rotation in the cam direction of rotation "E" or by opposite rotation of cam 12 in a cam rotation of direction "E'".

Figure 3:
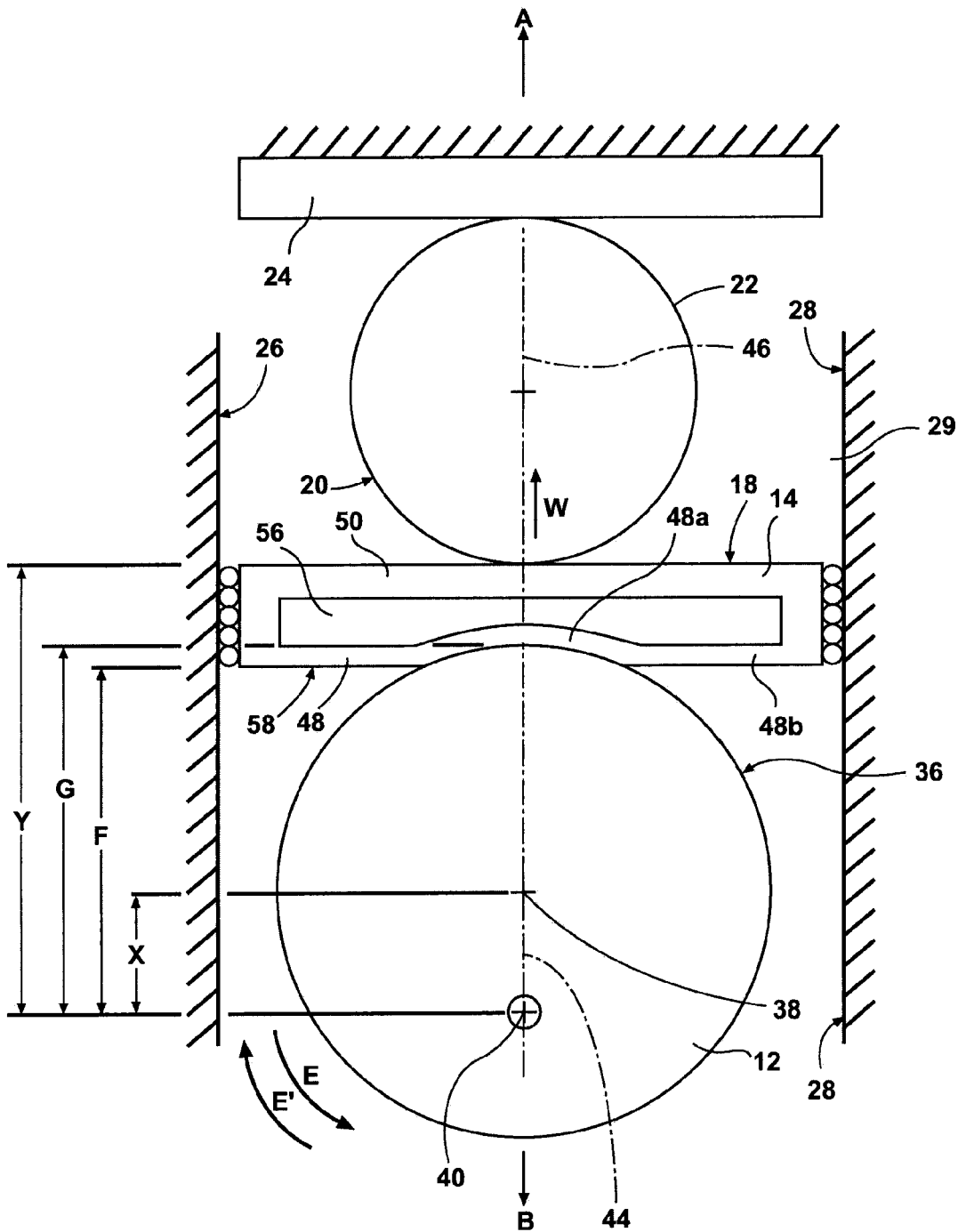
FIG. 3 is a front elevational view of the compliant follower system of Claim 1 in a top-dead-center position, compliant follower deflected condition.

Referring to FIG. 4 and again to FIGS. 1-3, according to further embodiments a compliant follower 62 is modified from compliant follower 14 by increasing a width of first and second follower side walls 64, 65. This modification decreases a volume of a cavity 66. In this embodiment, a first contact wall 68 is fully deflected when a first cavity wall 70 of cavity 66 is in alignment with a first contact point 72 defined between cam body outer surface 36 and a second contact surface 74 in the deflected condition of compliant follower 62. At the same time, a second cavity wall 76 of cavity 66 is in alignment with a second contact point 78 defined between cam body outer surface 36 and second contact surface 74 in the deflected condition of compliant follower 62. Contact between the first contact wall 68 and second contact surface 74 as first contact wall 68 elastically deflects follows the contour or shape of cam body outer surface 36 out to the first and second outward contact points 72, 78. A lateral location or positioning of the first and second cavity walls 70, 76 where they align with the second contact surface 74 locate the first and second outward contact points 72, 78 between the cam body outer surface 36 and the first contact wall 68 at a maximum deflected position "H" of the first contact wall 68.

Figure 4:
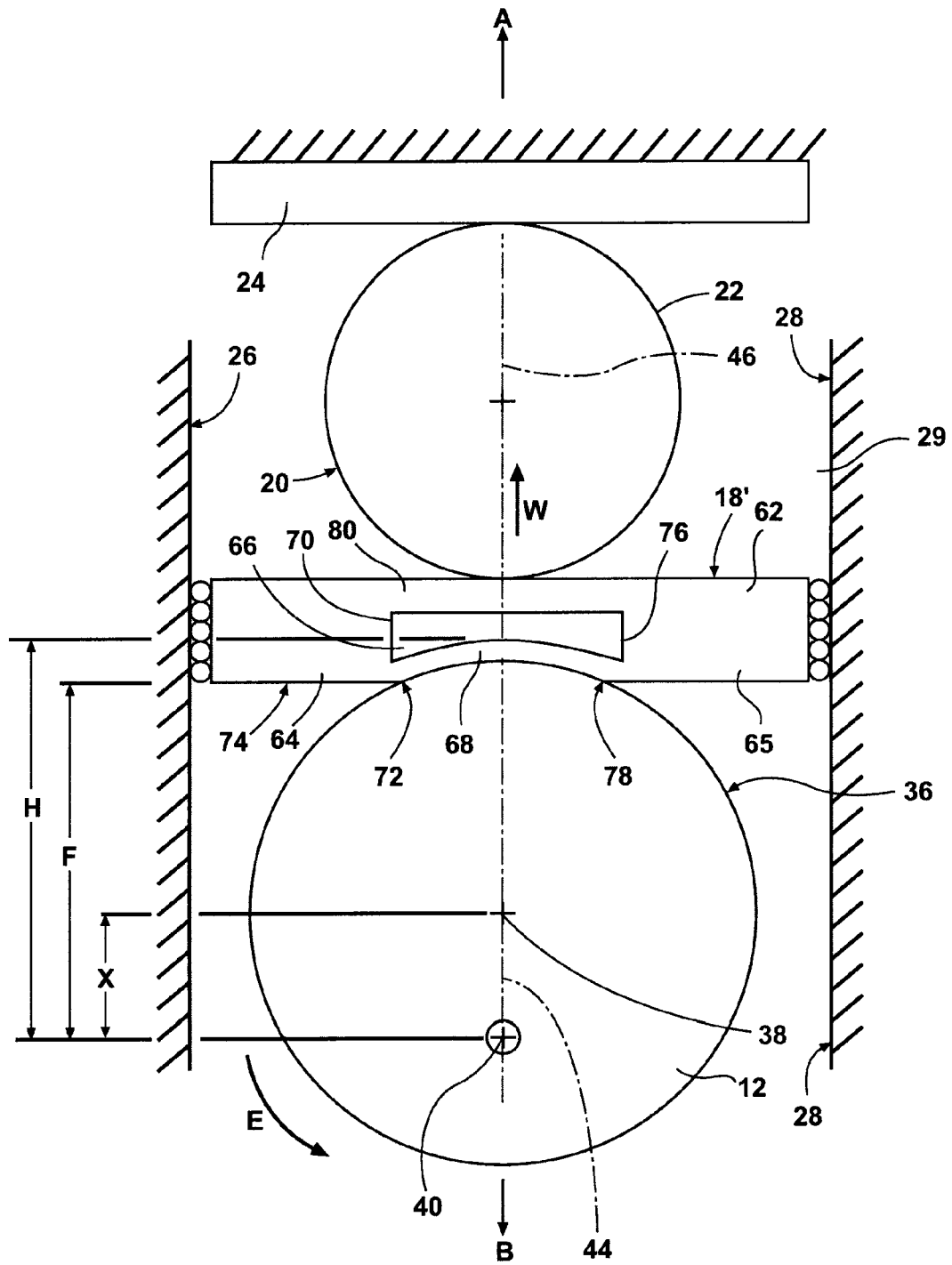
FIG. 4 is a front elevational view similar to FIG. 3, showing a further embodiment of a compliant follower.

Further deflection of compliant follower 62 from the maximum deflected position of the first contact wall 68 shown in FIG. 4 requires deflection of a second contact wall 80 oppositely positioned with respect to first contact wall 68, in the second direction "B", which is resisted by the greater thickness of second contact wall 80. A second contact wall 80 thickness is equal to the second contact wall thickness "D" of second contact wall 50, described in reference to FIG. 1. By adjusting the lateral positioning of first and second cavity walls 70, 76 in the embodiment of compliant follower 62, an effective stiffness of compliant follower 62 can be controlled, thereby controlling a holding force of compliant cam 62 at a specific deflection. A maximum deflected position "H" of first contact wall 68 is controlled by the geometry of cam 12, center-to-axis spacing "X", and a thickness of first contact wall 68. Similar to cavity 56, the lateral position of first and second cavity walls 70, 76 together with the first and second contact wall thicknesses "C" and "D" define a shape and an area of cavity 66, which according to several embodiments has a rectangular shape, but can be circular, oval, or other geometric shapes.

Figure 5:
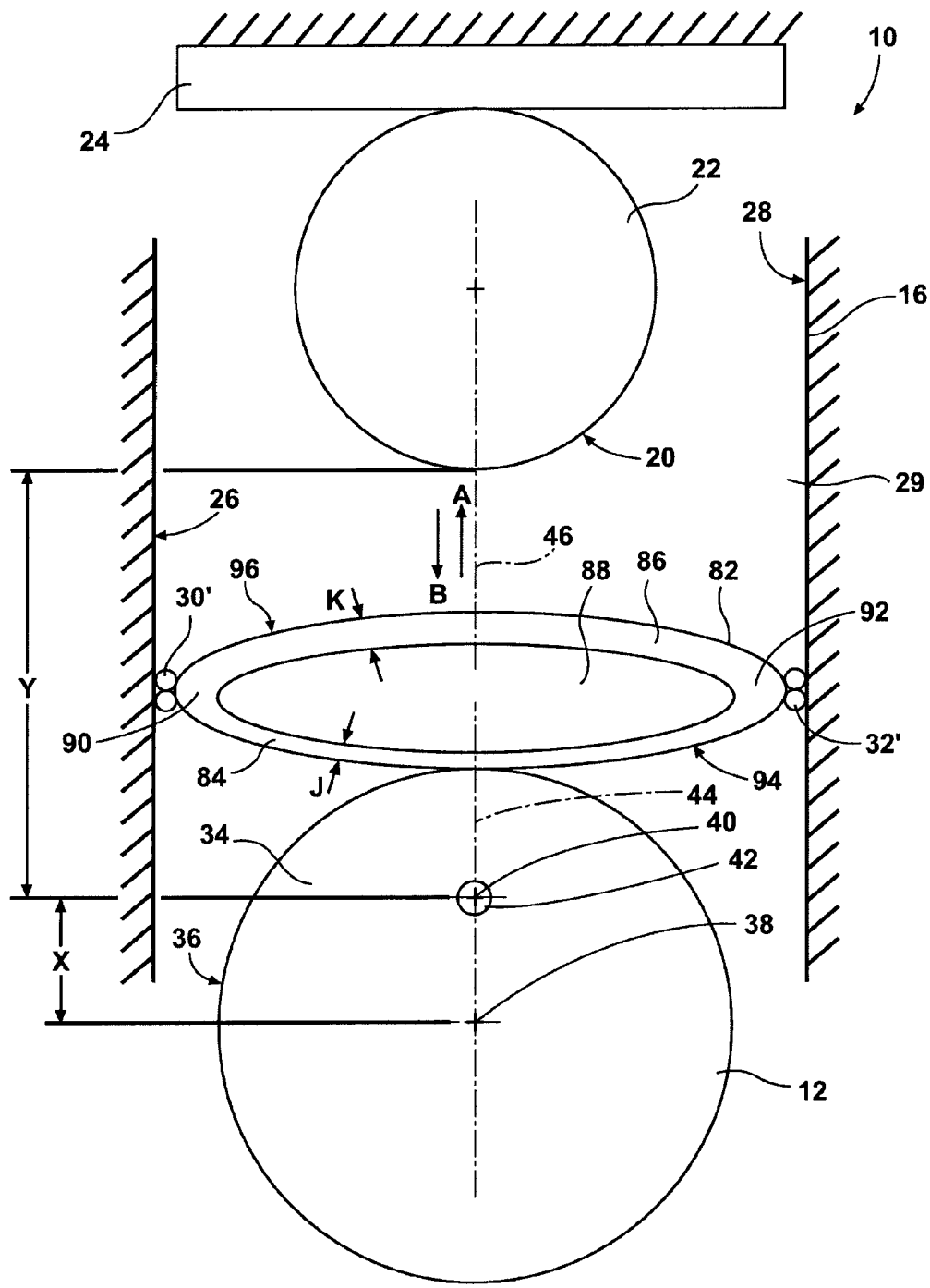
FIG. 5 is a front elevational view similar to FIG. 4, showing a further embodiment of a compliant follower.

Referring to FIG. 5 and again to FIGS. 1 and 4, a curved compliant follower 82 includes a curved first contact wall 84 having a first contact wall thickness "J", and an opposed curved second contact wall 86 having a second contact wall thickness "K" which is a greater thickness than first contact wall thickness "J" to induce first contact wall 84 to elastically deflect upon rotation of cam 12 without deflection of second contact wall 86. First and second contact wall thicknesses "J" and "K" can also be equal to permit both first and second contact walls 84, 86 to equally deflect upon rotation of cam 12. A substantially curve-shaped cavity 88 is created between first and second contact walls 84, 86. A thickness or width of opposed first and second follower side walls 90, 92 can also be varied to provide first and second outward contact points similar to first and second outward contact points 72, 78. Curved compliant follower 82 can be substituted for compliant followers 14, 62 for example to provide an increased initial resistance to deflection of first contact wall 84 compared to first contact wall 48, and to provide an increased resistance to deflection by use of second contact wall 86. The amount of curvature of curved compliant follower 82 can be increased or decreased, including providing a substantially circular compliant follower 82.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compliant follower cam system, comprising:
    a cam rotatable about a cam rotational axis and along a displacement axis;
    a compliant follower having a first convex contact wall opposing a second convex contact wall, the first contact wall and the second contact wall defining a cavity therebetween and the first contact wall being made of an elastically deformable material, wherein the cam is rotated along the displacement axis in a first direction into contact with the first contact wall of the compliant follower such that the first contact wall is deflected inward into the cavity when in contact with the cam; and
    wherein the second contact wall has thickness greater than a thickness of the first contact wall to induce deflection of the first contact wall without deflection of the second contact wall during a deflected condition.

2. The compliant follower cam system of claim 1, wherein an outer surface of the cam having a substantially circular shape.

3. The compliant follower cam system of claim 2, wherein the cam rotational axis is positioned between a geometric center of the cam and the first contact wall in a bottom-dead-center position of the cam; and the cam displacement axis aligned through the cam rotational axis, the cam displacement axis continuously co-axially aligned with a center axis of the cavity.

4. The compliant follower cam system of claim 3, wherein a top-dead-center position of the cam is defined when the cam is rotated until the geometric center of the cam and the cam rotational axis are both co-axially aligned with the center axis of the cavity having the geometric center positioned between the cam rotational axis and the first contact wall, providing a maximum elastically deflected position of the first contact wall.

5. A compliant follower cam system, comprising:
    a cam rotatable about a cam rotational axis and along a cam displacement axis, the cam having a geometric center spaced from the cam rotational axis;
    a compliant follower having a first convex contact wall opposing a second convex contact wall, the first contact wall and the second contact wall define a cavity therebetween and the first contact wall being made of an elastically deformable material, wherein the cam is rotated along the displacement axis in a first direction into contact with the first contact wall of the compliant follower such that the first contact wall is deflected inward into the cavity when in contact with the cam; and
    a non-deflected condition of the compliant follower defined when an outer surface of the first contact wall is in direct contact with an outer surface of the cam prior to deflection of the elastically deformable material and with the geometric center out of alignment with the cam displacement axis, the cam when thereafter rotated with respect to the cam rotational axis acting to move the geometric center toward the compliant follower and into alignment with the cam displacement axis, the cam thereby deflecting the first contact wall into the cavity defining a deflected condition of the compliant follower and creating a biasing force releasably frictionally engaging the first contact wall with the cam.

6. The compliant follower cam system of claim 5, wherein a wall thickness of the second contact wall is greater than a wall thickness of the first contact wall.

7. The compliant follower cam system of claim 5, wherein a wall thickness of the second contact wall is equal to a wall thickness of the first contact wall.

8. A compliant follower cam system, comprising:
    a cam rotatable about a cam rotational axis and along a cam displacement axis, the cam having a geometric center spaced from the cam rotational axis;
    a compliant follower having a first convex contact wall opposing a second convex contact wall, the first contact wall and the second contact wall define a cavity therebetween and the first contact wall being made of an elastically deformable material, wherein the cam is rotated along the displacement axis in a first direction into contact with the first contact wall of the compliant follower such that the first contact wall is deflected inward into the cavity when in contact with the cam;
    the second contact wall of the compliant follower aligned to directly contact a workpiece; and
    a non-deflected condition of the compliant follower defined when an outer surface of the first contact wall is in direct contact with an outer surface of the cam prior to deflection of the elastically deformable material with the geometric center out of alignment with the cam displacement axis, the cam when thereafter rotated with respect to the cam rotational axis acting to move the geometric center toward the compliant follower and into alignment with the cam displacement axis, the cam thereby deflecting the first contact wall into the cavity and defining a deflected condition of the compliant follower and creating a biasing force releasably frictionally engaging the first contact wall with the cam.

9. The compliant follower cam system of claim 8, further including a guide member having a guide member bore, the compliant follower having a center axis coaxially aligned with a bore axial centerline of the guide member bore such that the compliant follower is slidingly disposed in the guide member bore.

10. The compliant follower cam system of claim 8, further including a bearing member positioned between the compliant follower and a guide wall of the guide member.

* * * * *